United States Patent [19]

Rechter

[11] 4,233,079

[45] * Nov. 11, 1980

[54] ALUMINOUS REFRACTORY COMPOSITIONS CONTAINING CARBON, SILICON AND CHROME OXIDE

[75] Inventor: Harold L. Rechter, Country Club Hills, Ill.

[73] Assignee: Chicago Fire Brick Company, Chicago, Ill.

[*] Notice: The portion of the term of this patent subsequent to Jul. 1, 1980, has been disclaimed.

[21] Appl. No.: 88,549

[22] Filed: Oct. 26, 1979

Related U.S. Application Data

[63] Continuation-in-part of Ser. No. 17,270, Mar. 5, 1979.

[51] Int. Cl.³ .............................................. C04B 35/52
[52] U.S. Cl. ....................................... 106/56; 106/64; 106/65; 106/66
[58] Field of Search ....................... 106/44, 56, 65, 66, 106/64

[56] References Cited

U.S. PATENT DOCUMENTS

| 3,810,768 | 5/1974 | Parsons et al. | 106/56 |
| 3,842,760 | 10/1974 | Parsons et al. | 106/56 |
| 3,846,144 | 11/1974 | Parsons et al. | 106/56 |
| 3,888,687 | 6/1975 | Manigault | 106/66 |
| 3,923,531 | 12/1975 | Parsons et al. | 106/56 |
| 3,948,670 | 4/1976 | Manigault | 106/66 |
| 4,066,467 | 1/1978 | Rechter | 106/56 |
| 4,174,970 | 11/1979 | Gelsdorf et al. | 106/44 |

*Primary Examiner*—James Poer
*Attorney, Agent, or Firm*—Foster York

[57] ABSTRACT

A composition blending carbon with powdered chromium oxide in an alumina or aluminum silicate matrix, including silicon metal powder to inhibit carbon oxidation, is more advantageous in resisting molten iron and slags than refractories based on carbon or chrome additions not combined. The resultant refractory mixes are suitable for all conventional application methods.

12 Claims, No Drawings

ALUMINOUS REFRACTORY COMPOSITIONS CONTAINING CARBON, SILICON AND CHROME OXIDE

CROSS REFERENCE TO RELATED APPLICATION

This application is a continuation-in-part of my co-pending application Ser. No. 017,270, filed Mar. 5, 1979.

BACKGROUND OF THE INVENTION

1. Field of the Invention

The invention relates to an improvement in aluminous refractory compositions containing carbon and silicon, the term carbon including amorphous carbon and graphite.

2. Description of the Prior Art

The excellent ability of aluminous refractories containing carbon to withstand erosion by molten iron and slag is well known and such materials are commonly used to advantage in iron-making foundry and blast furnace facilities, particularly in tap hole and iron and slag spout areas.

The usual carbon refractory materials exhibit the disadvantage of rapid oxidation at temperatures above 900° F. limiting their working life. U.S. Pat. Nos. 3,810,768; 3,846,144; 3,842,760 and 3,923,531, in which applicant is one of the inventors, disclose the combination of powdered silicon metal with carbon along with aluminous refractory material to inhibit oxidation and improve mechanical properties. These carbon refractories also exhibit slag resistance, but their slag resistance is limited by the fact that increasing the carbon content increases oxidation so that there is a practical limit to the amount of carbon that may be used in the composition, generally less than 50% and usually not substantially higher than 35% by weight.

High alumina-chromic oxide compositions are disclosed in Manigault U.S. Pat. Nos. 3,888,687 and 3,948,670. These compositions do not contain carbon in the form of graphite or otherwise. There is no disclosure of the value of chromic oxide in increasing slag resistance and it is believed that such compositions without carbon are relatively ineffective in improving resistance against contact with basic slag compounds.

It is an object of my invention to obtain improved slag resistance without excessige high carbon content in aluminous-carbon refractory compositions.

SUMMARY OF THE INVENTION

I have found that the addition of chromic oxide to an aluminous refractory composition containing carbon and silicon is more advantageous in resisting molten iron and slags, especially basic slags, than refractories based on carbon or chrome additions not combined. The improvement is essentially in having the chromic oxide and carbon present in the aluminous compositions in amount to give greater resistance to slag over that of aluminous compositions in which the chromic oxide and carbon are absent. The improvement is especially important in compositions containing up to about 35% carbon.

The composition may contain as low as 10% of alumina or aluminum silicate, but preferably an alumina or clay aggregate is used containing a minimum of 40% alumina or aluminum silicate. Amounts of alumina or aluminum silicate up to 75% and even higher may be used depending upon the amount of carbon, chrome oxide, silicon metal and other ingredients present.

The chrome oxide may be present in 5-30% by weight, the carbon in 5-35% and the silicon metal in 5-25% or in amount sufficient to substantially inhibit oxidation of the carbon.

Compositions containing more than 35% by weight of carbon are of good slag resistance without the addition of chromic oxide although some slight improvement exists by the addition of chromic oxide at about 35% carbon such as, even as high as 50-75% carbon. However, such high carbon compositions do not have the strength of lower carbon compositions so that this invention of using not more than 35% carbon, such as 5-35% carbon with 5-30% chromic oxide, has the advantage of high strength with the same or better slag resistance of the high carbon compositions.

The compositions are therefore essentially comprised of alumina or aluminum silicate, carbon, chromium oxide and silicon metal.

The materials are mixed for use in the form of particles which may vary from fines to coarse particles. A mixture of coarse particles or grains is referred to herein as an aggregate, for example an alumina aggregate.

Binders such as a plastic clay, coat tar pitch, phosphoric acid and the like are preferably present in the mix or may be added later. Where the original mixture contains aluminous material in the form of a plastic aluminum silicate clay with or without calcined clay, this plastic clay may serve both as the aluminous material and the binder.

The aggregate aluminous grains can be selected for a wide choice of materials including calcined clays, calcined bauxites, fused or tabular aluminas, i.e., aluminum silicates to pure aluminum oxides. The aggregate component can be of ½ inch size maximum graded to finer sizes. Preferably maximum grain sizing is ⅜ inch by downs with 75% of the aggregate coarser than 20 mesh and at least 90% over 100 mesh. The coarsest grain size can be as fine as 1/16 inch, but this will not be as protective of the carbon component as aggregate in the ¼ to ⅜ inch range.

The carbon content may be in the form of amorphous carbon or natural or synthetic graphite. Grain sizing may start as coarse as ¼ inch by downs or coarser, but the bulk of it is preferably −30 mesh.

The chromic oxide is preferably present as the sesquioxide ($Cr_2O_3$) and is preferably of the pigment grade for maximum effectiveness, that is, essentially sub-micron. However, even coarser sizing has effectiveness, as for example, 100 mesh and coarser.

Silicon metal powder is added as an oxidation inhibitor for the graphite and suitably may be −20 mesh, preferably finer.

Also, there may be included in the composition clays useful for workability, green binders for prefired strength, coal tar pitch for reduced penetrability and increased carbon content. High alumina fines produce the most advantageous matrix, having at least 60% alumina content and grain sizing or −200 mesh, preferably −325 mesh. Further additions such as for extending shelf life of chemical bonded formulations or wetting agents are not precluded by suggested compositional ranges.

The refractory products made according to this description may be in the form of ramming plastics, pressed shapes, drier granular ramming mixes, castables, gunning mixes, hand patching plastics, and vibration placement mixes.

The method of application determines grain sizing, water content, and type and amount of clay addition.

Our preferred range of formulation can be summarized as follows (dry basis):

|  | % by weight |
| --- | --- |
| Alumina or aluminum silicate aggregate | 20-52 |
| High alumina fines, −200 mesh | 0-12 |
| Carbon or graphite | 5-35 |
| Silicon metal powder | 5-25 |
| Chromic oxide | 5-30 |
| Fine plastic clays | 0-15 |
| Coal tar pitch | 0-10 |
| Green binders (lignosulfonates or aluminum sulfate) | 0-7 |
| High alumina cement | 0-25 |
| Phosphoric acid or aluminum phosphate | 0-8 |

Water would be added in most cases, varying from about 12% for patching mixes, 10% for plastics, 5% for granular ramming mixes, 3% for prewetted gun mixes to dry for castables.

DETAILED DESCRIPTION AND PREFERRED EMBODIMENTS

The following examples are provided to show a range of products intended by this invention.

EXAMPLE 1

A ramming plastic formulation was prepared as follows:

|  | % by weight |
| --- | --- |
| Calcined bauxite (¼″ by downs) | 47 |
| −325 mesh calcined alumina | 9 |
| −30 mesh Mexican graphite | 12 |
| Pelletized coal tar pitch | 5 |
| Plastic ball clay | 2 |
| Western bentonite | 6 |
| Silicon metal powder | 8 |
| Chromium oxide | 8 |
| Aluminum sulfate | 3 |

Water was added to give a final moisture content of 10%. This product has been manufactured by extrusion and slicing, placed into cartons, and has performed remarkably well against foundry slags over a wide variety of basicities.

EXAMPLE 2

A granular ramming mix was prepared as follows:

|  | % by weight |
| --- | --- |
| Calcined bauxite (¼″ by downs) | 51 |
| −325 mesh calcined alumina | 8 |
| Mexican graphite (¼″ by downs) | 11 |
| Plastic ball clay | 8½ |
| Silicon metal powder | 6½ |
| Chromium oxide | 8½ |
| Phosphoric acid (75%) | 6½ |

Water was added to give a final moisture level of 6%. An addition of approximately 0.25% of citric acid can provide extended working life, particularly in warm environments.

EXAMPLE 3

A gunning mix was formulated as follows:

|  | % by weight |
| --- | --- |
| Calcined bauxite (¼″ by downs) | 54 |
| Chromium oxide | 8½ |
| Silicon metal powder | 6 |
| Calcium aluminate cement (>70% Al$_2$O$_3$) | 8½ |
| Mexican graphite (¼″ by downs) | 12½ |
| Western bentonite | 2 |
| −100 mesh kyanite | 8½ |

This material is bagged dry, but can be prewetted with 3% water addition just prior to gunning.

EXAMPLE 4

A product formulated for placement by vibration in a form, which can then be stripped for heating the lining so that it can soon be placed in service, is the following:

|  | % by weight |
| --- | --- |
| Calcined bauxite (¼″ by downs) | 38.8 |
| −325 mesh calcined alumina | 7.8 |
| Graphite (¼″ by 30 mesh) | 9.7 |
| Graphite (−30 mesh) | 9.7 |
| −35 mesh kyanite | 7.8 |
| Powdered silicon metal | 9.7 |
| Pelletized coal tar pitch | 5.8 |
| Chromic oxide | 7.8 |
| Lignosulfonate water suspension | 2.9 |

This material can be used at total water levels of 4½–6%, providing a trade-off on ease of vibration vs. tendency to slump on removal of forms.

EXAMPLE 5

Effective economical formulations are based on useage of calcined refractory clay aggregates, such as are available commercially from sources in Missouri and Georgia with alumina contents ranging from 40-70%. A formulation of a ramming mix using calcined clay aggregate of 40-47% alumina is as follows:

|  | % by weight |
| --- | --- |
| Calcined clay aggregate (¼″ by downs) | 50.5 |
| −325 mesh calcined alumina | 6.0 |
| −30 mesh natural graphite | 12.0 |
| Pelletized coal tar pitch | 4.5 |
| Plastic ball clay | 4.5 |
| Western bentonite | 3.0 |
| Silicon metal powder | 7.5 |
| Chromium oxide | 9.0 |
| Aluminum sulfate | 3.0 |

Water is added to give a moisture in the 6-7% range. This material can be boxed as a granular product.

EXAMPLE 6

Increased resistance to slag pepetration is achieved by increasing carbon and chrome oxide contents, as well as increased silicon metal content to protect the carbon, as in the following formulation:

|  | % by weight |
| --- | --- |
| Calcined clay aggregate (¼″ by downs) | 20 |
| −30 mesh natural graphite | 17 |

-continued

|  | % by weight |
| --- | --- |
| Pelletized coal tar pitch | 5 |
| Fine plastic clays | 12 |
| Silicon metal powder | 23 |
| Chromium oxide | 23 |

Water is added to give a moisture in the 6–7% range for a ramming mix, about 9% for an extrudable refractory plastic. Higher moisture will provide hand patching or troweling consistencies.

EXAMPLE 7

Highly oxidation resistant versions are made using calcined bauxitic clay aggregates of 60–70% aluminum oxide, such as Mulcoa 60 and Mulcoa 70 sold by C-E Minerals Corporation:

|  | % by weight |
| --- | --- |
| Calcined clay aggregate (Mulcoa 60 or 70) −4 × 20 mesh | 50 |
| −200 mesh Mulcoa 70 | 10 |
| −30 mesh natural graphite | 11 |
| Fine plastic clays | 8 |
| Silicon metal powder | 8 |
| Chromium oxide | 8 |
| Lignosulfonate liquor, 50% aqueous suspension | 5 |

Water is added to make a granular ramming mix in the 4–5% moisture range for maximum density and effectiveness.

EXAMPLE 8

Higher purity systems are formulated with tabular alumina and low ash carbon fines.

|  | % by weight |
| --- | --- |
| −6 mesh tabular alumina | 44 |
| Fine plastic clays | 9 |
| Silicon metal powder | 8 |
| Chromium oxide | 28 |
| −30 mesh coke fines | 11 |

Water is added to produce a ramming mix or plastic consistency.

EXAMPLE 9

Phosphate bonding is an effective means of obtaining high strength by preliminary heating to cure prior to use in service, providing initial impact resistance to molten metal flow after installation.

|  | % by weight |
| --- | --- |
| −6 mesh tabular alumina | 45 |
| −30 mesh natural graphite | 6 |
| Western bentonite, −200 mesh | 8 |
| Silicon metal powder | 8 |
| Chromium oxide | 27 |
| 75% concentrated phosphoric acid | 6 |

Water is added as in previous example to achieve a ramming mix or plastic consistency.

In the specification and claims the term "high alumina" refers to an alumina-containing composition containing at least 40% by weight alumina, preferably at least 60% $Al_2O_3$.

All percentages are in weight percent.

I claim:

1. In a refractory composition comprising alumina or aluminum silicate refractory material, carbon and powdered silicon, the improvement of having chromic oxide and carbon present in the composition in amount sufficient to give greater resistance to slag over that of aluminous composition in which chromic oxide and carbon are absent, said carbon being present in up to about 35%.

2. The composition in accordance with claim 1 in which the alumina or aluminum silicate is present in at least 10%, the chromic oxide is present in 5–30%, the carbon is present in 5–35% and the silicon metal is present in 5–25%.

3. The composition of claim 2 in which the alumina or aluminum silicate is present in 10–75% by weight.

4. The composition of claim 3 in which a binding agent of plastic clay is present.

5. The composition of claim 1 in which the carbon is graphite.

6. The composition of claim 1 in which the aluminous material is present in at least 40% alumina.

7. A refractory composition comprising

|  | % by weight |
| --- | --- |
| Alumina or aluminum silicate aggregate | 20–52 |
| High alumina fines, −200 mesh | 0–12 |
| Carbon or graphite | 5–35 |
| Silicon metal powder | 5–25 |
| Chromic oxide | 5–30 |
| Fine plastic clays | 0–15 |
| Coal tar pitch | 0–10 |
| Green binders (lignosulfonates or aluminum sulfate) | 0–7 |
| High alumina cement | 0–25 |
| Phosphoric acid or aluminum phosphate | 0–8 . |

8. The refractory composition of claim 1 wherein the said composition is a plastic suitable as a ramming mix and comprises alumina or aluminum silicate aggregate, coal tar pitch, clay and aluminum sulfate.

9. The refractory composition of claim 1 wherein the said composition is a gunning mix and the composition comprises alumina or aluminum silicate aggregate, calcium aluminate cement, kyanite and bentonite.

10. The refractory composition of claim 1 wherein the said composition is suitable for vibration placement and the composition comprises alumina or aluminum silicate aggregate, kyanite and coal tar pitch.

11. The refractory composition of claim 1 wherein the composition is a granular ramming mix and the composition comprises alumina or aluminum silicate aggregate, phosphoric acid and clay.

12. The refractory composition of claim 1 wherein the said composition comprises alumina in the form of calcined bauxite.

* * * * *